United States Patent
Chen et al.

(10) Patent No.: US 10,668,416 B2
(45) Date of Patent: Jun. 2, 2020

(54) GRANULAR FILTRATION MEDIA MIXTURE AND USES IN WATER PURIFICATION

(71) Applicant: HaloSource, Inc., Bothell, WA (US)

(72) Inventors: Yongjun Chen, Bothell, WA (US); Hiroyuki Kawai, Edmonds, WA (US); Patricia Q. Bottari, Edmonds, WA (US); Christopher R. Ashley, Seattle, WA (US); Andrew F. Mason, Seattle, WA (US)

(73) Assignee: STRIX (USA), INC., Bothell, WA (US)

( * ) Notice: Subject to any disclaimer, the term of this patent is extended or adjusted under 35 U.S.C. 154(b) by 342 days.

(21) Appl. No.: 15/503,999

(22) PCT Filed: Aug. 14, 2015

(86) PCT No.: PCT/US2015/045339
§ 371 (c)(1),
(2) Date: Feb. 14, 2017

(87) PCT Pub. No.: WO2016/025873
PCT Pub. Date: Feb. 18, 2016

(65) Prior Publication Data
US 2017/0239600 A1    Aug. 24, 2017

Related U.S. Application Data (60) Provisional application No. 62/203,294, filed on Aug. 10, 2015, provisional application No. 62/117,932, (Continued)

(51) Int. Cl.
*C02F 1/28* (2006.01)
*C02F 1/42* (2006.01)
(Continued)

(52) U.S. Cl.
CPC .......... *B01D 39/02* (2013.01); *B01D 15/361* (2013.01); *B01D 24/02* (2013.01); *B01D 39/04* (2013.01);
(Continued)

(58) Field of Classification Search
CPC .......... C02F 1/003; C02F 1/281; C02F 1/283; C02F 1/288; C02F 1/62; C02F 2101/20;
(Continued)

(56) References Cited

U.S. PATENT DOCUMENTS

| 4,190,532 A | 2/1980 | Halbfoster |
| 4,341,807 A | 7/1982 | Turbak et al. |

(Continued)

FOREIGN PATENT DOCUMENTS

| CN | 1200353 A | 12/1998 |
| CN | 101443090 A | 5/2009 |

(Continued)

OTHER PUBLICATIONS

Chinese Office Action dated Aug. 28, 2018, issued in Chinese Application No. 201580052037.1, filed Aug. 14, 2015, 19 pages.
(Continued)

*Primary Examiner* — Matthew O Savage
(74) *Attorney, Agent, or Firm* — Christensen O'Connor Johnson Kindness PLLC (57) ABSTRACT

Provided is a granular filtration media comprising a mixture of granular filtration media and less than 5% of nanofibers based on the dry weight, method of making the same and uses of the same for removing contaminants from water, including metals, heavy metals, synthetic or natural organic matters, colloidal or suspended particles to improve the chemical safety and purity of water for the purpose of water purification, specifically, one embodiment of the present (Continued)

invention disclosed is use of the granular filtration media to remove particulate lead from high pH water.

17 Claims, 2 Drawing Sheets

Related U.S. Application Data filed on Feb. 18, 2015, provisional application No. 62/038,068, filed on Aug. 15, 2014.

(51) Int. Cl.
*B01D 39/04* (2006.01)
*B01D 39/06* (2006.01)
*B01D 39/02* (2006.01)
*B01D 15/36* (2006.01)
*B01D 24/02* (2006.01)
*C02F 1/00* (2006.01)
*B01D 39/20* (2006.01)
*C02F 101/20* (2006.01)

(52) U.S. Cl.
CPC .............. *B01D 39/06* (2013.01); *C02F 1/003* (2013.01); *C02F 1/281* (2013.01); *C02F 1/283* (2013.01); *C02F 1/42* (2013.01); *B01D 39/2058* (2013.01); *B01D 2101/02* (2013.01); *B01D 2239/025* (2013.01); *B01D 2239/0407* (2013.01); *B01D 2239/0442* (2013.01); *B01D 2239/10* (2013.01); *C02F 2101/20* (2013.01); *C02F 2305/08* (2013.01); *C02F 2307/04* (2013.01)

(58) Field of Classification Search
CPC .... C02F 2305/08; C02F 1/42; C02F 2307/04; B01D 39/04; B01D 39/2058; B01D 39/02; B01D 39/06; B01D 15/361; B01D 24/02; B01D 2101/02; B01D 2239/10; B01D 2239/0442; B01D 2239/0407; B01D 2239/025

See application file for complete search history.

(56) References Cited

U.S. PATENT DOCUMENTS

| | | | |
|---|---|---|---|
| 4,374,702 A | | 2/1983 | Turbak et al. |
| 4,378,381 A | | 3/1983 | Turbak et al. |
| 4,481,077 A | | 11/1984 | Herrick |
| 4,483,743 A | | 11/1984 | Turbak et al. |
| 6,200,483 B1 | | 3/2001 | Cutler et al. |
| 6,405,875 B1 | | 6/2002 | Cutler |
| 6,524,477 B1 | | 2/2003 | Hughes |
| 6,572,769 B2 | | 6/2003 | Rajan et al. |
| 6,872,311 B2 | | 3/2005 | Koslow |
| 6,913,154 B2 | | 7/2005 | Koslow |
| 7,276,161 B2 | | 10/2007 | Rajan et al. |
| 7,291,578 B2 | | 11/2007 | SenGupta et al. |
| 7,413,663 B2 | | 8/2008 | Rajan et al. |
| 7,504,036 B2 | | 3/2009 | Gottlieb et al. |
| 7,708,892 B2 | | 5/2010 | Klipper et al. |
| 8,002,990 B2 | | 8/2011 | Schroeder et al. |
| 8,110,526 B2 | | 2/2012 | Misra et al. |
| 8,167,141 B2 | | 5/2012 | Knipmeyer et al. |
| 2004/0178142 A1* | | 9/2004 | Koslow .................. A61L 2/0017 210/500.29 |
| 2006/0000763 A1 | | 1/2006 | Rinker et al. |
| 2008/0110820 A1* | | 5/2008 | Knipmeyer ............. C02F 1/003 210/474 |
| 2008/0223797 A1 | | 9/2008 | Reid et al. |
| 2011/0073551 A1 | | 3/2011 | Reid et al. |
| 2013/0037481 A1* | | 2/2013 | Lalouch .................. C02F 1/001 210/435 |
| 2015/0122719 A1* | | 5/2015 | Lombardo .............. C02F 1/288 210/287 |
| 2016/0031724 A1 | | 2/2016 | Kellam et al. |

FOREIGN PATENT DOCUMENTS

| | | |
|---|---|---|
| CN | 102728326 A | 10/2012 |
| CN | 102762295 A | 10/2012 |
| CN | 102872829 A | 1/2013 |
| CN | 102941068 A | 2/2013 |
| CN | 103100376 A | 5/2013 |
| CN | 103143327 A | 6/2013 |
| DE | 202010009494 U1 | 6/2011 |
| DE | 102010024989 A1 | 8/2011 |
| EP | 0 345 381 A2 | 12/1989 |
| JP | 07-328353 A | 12/1995 |
| JP | 11333290 A | 12/1999 |
| JP | 2005-515880 A | 6/2005 |
| JP | 2010-534560 A | 11/2010 |
| JP | 2010534560 A | 11/2010 |
| JP | 2012-223674 A | 11/2012 |
| WO | 97/32646 A1 | 9/1997 |
| WO | 2008/036844 A2 | 3/2008 |
| WO | 2008/073507 A2 | 6/2008 |
| WO | 2009/017645 A2 | 2/2009 |
| WO | 2009017645 A2 | 2/2009 |
| WO | 2010/111692 A2 | 9/2010 |
| WO | 2011/098211 A1 | 8/2011 |

OTHER PUBLICATIONS

International Preliminary Report on Patentability dated Mar. 2, 2017, issued in corresponding International Application No. PCT/US2015/045339, filed Aug. 14, 2015, 6 pages.

Andrews, R., "NSF Updates Filter Standard to Include Lead Reduction Requirements," PM Engineer Magazine, Sep. 1, 2008, <http://www.pmengineer.com/articles/87721-nsf-updates-filter-standard-to-include-lead-reduction-requirements> [retrieved May 31, 2017], 4 pages.

Brigano, F.A., and A. Lombardo, "Filter Formula: Testing and Developing a Lead-Reduction Filter for Gravity Pitchers," Water Quality Products, Jun. 2012, pp. 10-11.

International Search Report dated Oct. 26, 2015, issued in corresponding International Application No. PCT/US2015/045339, filed Aug. 14, 2015, 3 pages.

Second Chinese Office Action and Translation dated Mar. 8, 2019 for Chinese Application No. 201580052037.1 filed Aug. 14, 2015, 21 pages.

Chinese Office Action dated Aug. 23, 2019, issued in Chinese Application No. 201580052037.1, filed Aug. 14, 2015, 9 pages.

Examination Report dated Sep. 18, 2019, issued in Indian Application No. 201737005410, filed Aug. 14, 2015, 7 pages.

Japanese Office Action, Japanese Application No. 2017-508021, dated May 22, 2019, 7 pages.

Chinese Office Action dated Jan. 1, 2020, issued in Chinese Application No. 201580052037.1, 12 pages.

Notice of Reasons for Rejection dated Feb. 3, 2020, issued in Japanese Application No. 2017-508021, 10 pages.

Search Report dated Jan. 1, 2020, issued in Brazilian Patent Application No. BR112017003077-2, 7 pages.

* cited by examiner

GRANULAR FILTRATION MEDIA MIXTURE AND USES IN WATER PURIFICATION

CROSS-REFERENCE TO RELATED APPLICATION

This application claims the benefit of U.S. Provisional Application No. 62/038,068, filed on Aug. 15, 2014; U.S. Provisional Application No. 62/117,932, filed on Feb. 18, 2015; and U.S. Provisional Application No. 62/203,294 filed on Aug. 10, 2015, the disclosures of which are expressly incorporated herein by reference.

TECHNICAL FIELD

Embodiments of this invention relate to a composite granular filtration media comprising a mixture of granular filtration media and nanofibers to remove contaminants from water source such as drinking water for water purification application.

BACKGROUND OF THE INVENTION

Safe and clean drinking-water is a basic need for human development, health, and well-being. As global industrialization and economic development continue growing, the concerns associated with water contamination are becoming more serious and urgent to be addressed. The increasing consumption of contaminated water for human is also arising more and more health-related public concerns. Therefore, the need for improving water purification technology continues to grow dramatically in the U.S. and abroad.

Generally, the contaminants in the water can be categorized into chemical contaminants and biological contaminants. As water pollution is increasing in occurrence, the potential health and safety issues associated with the chemical contaminants in the water is becoming a more prominent global concern. Some examples of the chemical contaminants include toxic anions (fluoride, arsenite, arsenate, nitrate, chromate, selenite, selenate, etc.); metals; heavy metals (lead, mercury, cadmium, zinc, copper, chromium, etc.); synthetic or natural organic matters; etc. It is well known that most of the heavy metals are toxic to human beings and should be removed from drinking water.

Additionally, many water treatment applications are required to meet specific regulatory requirements pertaining to the removal of these species prior to discharge. These regulations are subject to change as a result of scientific findings as well as with improved detection/analytical techniques. For example, in 2007, the NSF Intl. Drinking Water Treatment Unit Joint Committee revised the NSF/ANSI Standard 53 protocol for pH 8.5 lead reduction based on research into the nature of lead particles. The new protocol specifies a size range for the colloidal or fine particle portion (between 0.1-1.2 micron) which was undefined previously. This change did not pose a significant problem for pressurized filters (e.g. carbon blocks) but did introduce additional challenges for low pressure (less than 30 psi) and gravity flow filters, which have difficulty with colloidal materials Gravity flow or low pressure flow filtration systems are well known in the art, because of their generally lower cost and user convenience. Such systems include pour-through carafes, water coolers and refrigerator water tanks, which have been developed by The Clorox Company®, Culligan®, Rubbermaid®, and Glacier Pure®, et al. Typically, these systems are filled with tap water from municipal supplies or rural wells, as the user wishes to remove chlorine and/or lead or other chemical contaminants, or to generally improve the chemical safety of the water and the taste/odor of the water. The marketing need of these devices is continuing to grow quickly, especially in view of the emphasis on healthier and safer drinking water, and further in view of the expense and inconvenience of purchasing bottled water.

Most of the gravity-fed or low pressure flow filters utilize a combination of granular filtration media, such as granular-activated carbon (GAC) and ion exchange resin (IER). These devices have been proven effective in removing contaminants such as organics, copper, mercury, cadmium, zinc, and residual chlorine, etc., within compliance of regulatory standards. Commercially, these filtration devices typically feature relatively small, disposable and replaceable filter cartridges that are inserted into the water purification devices and used for several weeks of normal use. However one problem associated with filters containing a mixture of granular activated carbon and ion exchange resin is that they have limited contaminant removal capability. When large granules are packed together, large interstitial voids can form between the granules, which results in effective pore sizes which are larger than colloidal particles. These particles, like the ones specified by the NSF/ANSI 53 protocol, could pass through these voids and into the effluent, thus may fail to meet regulatory standards.

Granular activated carbon, with or without binder, and with or without various other additives such as lead scavengers, has been well developed and broadly used as a filtration media in water purification filters for many years. The granular activated carbon is typically loaded into a compartment inside a filter housing to act as a filter or a carbon "bed". The housing and internals are designed to contain the loose granules in place in the compartment, to distribute water to the inlet of the bed, and collect the water at the outlet of the bed. Generally, a bed of GAC, with optional other granular media or additives, is the typical media composition of choice for low pressure or gravity flow applications, because of the relatively low pressure drop through the bed of granules than other media.

Good water flow rate through the filter is another primary concern in a low pressure or a gravity flow water system such as a water pitcher device, water cooler device, or the like because this affects how quickly filtered water from a freshly-water-filled device may be used to satisfy the consumer's expectation. That is why the granular filtration media mixture is frequently selected to fill in those types of filters.

Overall, the ideal filter for the gravity-fed or low pressure device provides high efficiency at contaminant removal and high flow rate. The existing gravity flow or low pressure flow filters can generally achieve a good flow rate, however, as mentioned previously, they also have some limited contaminant removal capability to removal particulate contaminants from the water source. Therefore, the existing gravity flow and low pressure flow granular filtration media mixture needs to be improved to achieve higher contaminant removal efficacy, specifically with regards to colloidal and suspended particles.

Knipmeyer, in U.S. Pat. No. 8,167,141, discloses a gravity-fed carbon block water filter comprising an activated carbon and a lead scavenger, which could deliver a final effluent water containing less than 10 ppb after 151 liters of source water filtration to meet the revised NSF standard of lead removal claim. However, when carbon blocks designed for pressurized systems are applied to gravity flow systems, they often add more cost and fail to produce the desired flow rates consistently over time.

U.S. Pat. No. 8,002,990, issued to Schroeder on Aug. 23, 2011, discloses a filter using fibrillated nanofiber-loaded fine powders of filter media, such as ion exchange resin, to remove soluble and insoluble particles from a fluid. However, when the media is used in a gravity-fed or a low pressure filtration system, the flow rate will be significantly reduced in comparison with the granular filtration media. Furthermore, compared with the present commercially available gravity-fed or low pressure-fed filters filled with granular filtration media the cost will also be more greater.

Koslow, in U.S. Pat. Nos. 6,872,311; 6,913,154, discloses the use of nanofibers to improve filtration efficiency. These patents teach a fibrillated physical process that can enhance the performance of existing standard filter media such as cellulose fiber, and further teach a method of making an improved air filter medium incorporated with nanofibers. However, this invention does not teach how to improve the existing granular filtration media for the purpose of removal of particulates from a contaminated water by using nanofibers.

Halbfoster, in U.S. Pat. No. 4,190,532, describes a filter material composition comprising a mixture of ion exchange resin particles and cellulose filter aid for use in removing suspended and colloidal particles, such as silica or iron oxide, from water. This invention has been commercially practiced in the high quality water supply process for a long time, however the particle removal efficacy still needs to be improved.

It is believed that there is a need to improve existing granular media (and combinations) for use in gravity flow and low pressure filters such that adequate flow rates are achieved while maintaining high contaminant removal. Specifically, there is a need for media that can remove colloidal and suspended particles from water, such as particulate lead as specified in NSF/ANSI 53.

SUMMARY OF THE INVENTION

Provided is a granular filtration media mixture comprising granular filtration media and less than 5% of nanofibers based on the dry weight, and further having a moisture content in a range of 3% to 70% by weight.

In one embodiment, a granular filtration media includes but not limited to, porous or nonporous, dry or moisture-containing granular particles having the particle size in the range of 100-2000 microns.

In another embodiment, the nanofiber includes but not limited to, synthetic polymeric nanofiber, natural polymeric nanofiber, and derivative of natural polymeric nanofiber, inorganic nanofiber or any combinations of thereof, and further having an average diameter in a range of 5 nanometers to 2 micron.

In an additional embodiment of the present invention, provides a method of preparing a granular filtration media mixture comprising the steps of:

1) Dispersing the nanofiber in a solvent composition to prepare a nanofiber dispersion.
2) Adding granular filtration media into the nanofiber dispersion and blend them together and separating them by filtration. The final granular media product could be used as it is or further to be dried to moisture content not less than 3%.

In another embodiment, provides a method of use of the granular filtration media mixture provided by this invention to remove contaminants from water (e. g. drinking water, industrial water, environmental water, recreational water) by contacting the water with the granular filtration media mixture with or without combinations of other filtration media for the purpose of water purification applications.

In one embodiment of the present invention, provides a water filter comprising of the granular filtration media mixture alone or combinations of other existing filtration media, it may be used in a tap water from municipal supplies or rural wells; point-of-use; point-of-entry; municipal water treatment; recreational water from a pool or spa; environmental water; industrial process water; industrial waste water; municipal waste water and agriculture irrigation water to remove contaminants, such as particulate particles, colloidal particles, fine particles, suspended particles, organic, residual halogen, selenium, metals, heavy metals (lead, copper, mercury, cadmium, zinc, chromium), etc.

In one embodiment, a granular filtration media mixture includes a granular filtration media and nanofibers, wherein the granular filtration media has an average particles size in the range of 100 micron to 2000 microns, and the nanofibers have an average diameter in a range of 5 nanometers to 2.0 microns.

In one embodiment, a granular filtration media mixture includes a granular filtration media and nanofibers in an amount of less than 5% by dry weight of said filtration medium.

In one embodiment, a granular filtration media mixture includes a granular filtration media and fibrillated nanofibers, wherein the mixture has a moisture content in the range of 3% to 70%.

In one embodiment, a granular filtration media mixture includes a granular filtration media and nanofibers, wherein the granular filtration media has an average particle size in a range of 100 micron to 2000 microns and is selected from the group of granular activated carbon, granular activated alumina, granular diatomaceous earth, granular silica gel, granular zeolites, granular silicates, granular synthetic molecular sieves, granular ion exchange resin particles, granular mineral clay, granular aluminosilicates, granular titanates, granular bone char, granular KDF process media, granular iodated resins, granular ceramic, granular perlite, granular sand, granular hybrid of ion exchange resin with metal oxides, granular hybrid of activated carbon with metal oxides, functionalized granular activated carbon, polymeric adsorbent resins, or any combinations thereof. Wherein said a nanofiber having an average diameter in a range of 5 nanometers to 2.0 microns, is selected from synthetic polymeric nanofiber, natural polymeric nanofiber, derivative of natural polymeric nanofiber, inorganic nanofiber or any combinations of thereof.

In one embodiment, a method of making the granular filtration media mixture includes the steps of: dispersing nanofibers; and adding granular filtration media into the nanofiber dispersion; and mixing; and separating by filtration; and obtaining a wet media or dry media by drying.

In one embodiment, a method of enhancing performance of a granular filtration media-containing filter includes the step of:

Providing a fibrillated nanofiber dispersion; wet laying or placing the dispersion onto the top surface of filtration media of the filter, wherein the total amount of the fibrillated nanofibers is not more than 5% by dry weight of the total granular filtration media of the filter.

In one embodiment, a granular filtration medium comprising the mixture of a granular filtration medium and fibrillated nanofibers is used in removing impurities from a fluid system.

In one embodiment, the fluid system to be purified is water. In one embodiment, the fluid system to be purified is air.

In one embodiment, the impurities to be removed from the water or air fluid systems are selected from the group of residual halogen, heavy metal ions, colloidal particles, fine particles, organic contaminants, or any combination thereof.

In one embodiment, the impurities to be removed from the water or air fluid systems are particulate lead.

In one embodiment, the impurities to be removed from the water or air fluid systems are selected from colloidal and fine particles of lead, copper, iron oxide, iron oxide hydroxide, and silica.

In one embodiment, the impurities to be removed from the water or air fluid systems are selected from the group of copper, mercury, lead, cadmium, and zinc.

In one embodiment, the impurities to be removed from the water or air fluid systems are total available residual halogen (e.g. chlorine or bromine) in the water.

In one embodiment, a water purification filter includes a first granular filtration medium, a screen separator, and a filtration medium mixture of granular filtration medium and nanofibers.

In one embodiment, a water purification filter including the first granular filtration medium, the screen separator, and the filtration medium mixture of granular filtration medium and nanofibers is used in a gravity-fed and or a low pressure-fed filtration system to remove copper, zinc, mercury, cadmium, lead in a gravity-fed or low pressure-fed filter to meet the NSF 42/53 compliance.

In one embodiment, a water purification filter includes a mixture of filtration medium comprising of granular activated carbon, ion exchange resins and fibrillated nanofibers.

In one embodiment, a water purification filter including the mixture of filtration medium comprising of granular activated carbon, ion exchange resins and fibrillated nanofibers is used in a gravity-fed and or a low pressure-fed filtration system to remove water contaminants including but not limited to residual halogen, copper, zinc, cadmium, mercury, lead, organic contaminants.

In one embodiment, a water purification filter includes a wet laid fibrillated nanofiber dispersion on the top of a filtration medium mixture of granular activated carbon and ion exchange resins.

In one embodiment, a water purification filter including the wet laid fibrillated nanofiber dispersion on the top of the filtration medium mixture of granular activated carbon and ion exchange resins is used in a gravity-fed and or a low pressure-fed filtration system to remove water contaminants including but not limited to residual halogen, copper, zinc, cadmium, mercury, lead, organic.

In one embodiment, a method of purifying water includes:

Allow contaminated water flow through a filter comprised of mixed granular filtration media with fibrillated nanofibers followed by flow through a filter comprised of ion exchange resin to remove water contaminants including but not limited to residual halogen, copper, zinc, cadmium, mercury, lead, organic.

In one embodiment, a method of making a water purification filter includes:

First placing a granular filtration medium in the bottom of a filter chamber or a bed, followed by placing a screen separator, a mixed granular filtration medium with fibrillated nanofibers on the top, and sealed.

In one embodiment, a method of making a water purification filter includes filling the mixed filtration medium of granular activated carbon, ion exchange resins and fibrillated nanofibers in a filter cartridge and or filter beds.

In one embodiment, a method of making a water purification filter includes first filling a filter cartridge with a mixture of granular filtration medium and followed by wet laid a fibrillated nanofiber dispersion on the top of the filter.

In one embodiment, a method of making a water purification filter includes first placing a granular filtration medium in the bottom of filter cartridge, followed by placing a screen on the top of the first filtration medium, then placing the mixed filtration media of multiple granular filtration media and fibrillated nanofibers.

In one embodiment, a water purification filter includes a first media mixture comprising of granular filtration media and nanofibers; and a second granular filtration media, with or without a screen to separate the first media and the second media, or just blend the first and second media together.

In one embodiment, the first media mixture is selected from combinations of nanofibers admixed with any combinations of activated carbon particles, zeolite, ion exchange resin, or silica; and the second filtration media is selected from ion exchange resin, zeolite.

In one embodiment, the water filter including the first media mixture comprising of granular filtration media and nanofibers and the second granular filtration media can be used in a gravity flow and or a low pressure flow cartridge, to remove chemical contaminants including without being limited to, organic matters, copper, zinc, mercury, cadmium, lead, residual halogen such as residual chlorine or residual bromine in the drinking water source.

These and other embodiments will be further appreciated with reference to the following detailed description and examples.

DESCRIPTION OF THE INVENTION

The objective of the present invention is to provide a granular filtration media mixture composition comprising of granular filtration media and nanofibers, and the uses of the same to improve the water contaminants reduction or removal efficacy for the application of water purification.

It is well-known that the granular filtration media in the prior art has been broadly used in the water purification not only for the benefits of high flow rate, also for convenience and cost-effectiveness, however, the removal efficacy for the particulate particles from the water needs to be improved.

Definitions

The term "impurities or contaminants from water" shall mean chemical contaminants and or biological contaminants. The biological contaminants have been addressed by disinfection technology. The chemical contaminants will include without being limited to: particulate particles, colloidal particles, fine particles, suspended particles, organic compounds, residual halogen, selenium, arsenate, arsenite, fluoride, dichromate, manganese, tin, platinum, iron, cobalt, chromate, molybdate, selenite, senelate, uranium, vanadium, vanadate, ruthenium, antimony, molybdenum, tungsten, barium, cerium, lanthanum, zirconium, titanium, and or radium, zinc, copper, lead, mercury, cadmium, as well as natural organic matter (NOM), pesticide and herbicide residues, endocrine disruptors, pharmaceutical residues and organic compounds released through industrial discharges. For example, most of the heavy metals are toxic to human beings and should be removed by a filtration or a purification process.

The terms "particles and particulates" are being used substantially interchangeable. Generally, a particle is a small piece or individual part. A particulate pertains to or is formed of particles. The particles used in embodiments of the present invention can remain separate or may clump, physically intermesh, electro-statically associate, or otherwise associate to form particulates. The particulate can include suspended particles, colloidal particles, or fine particles within a range of particle size 50 nm to 100 microns.

The term "colloidal or fine particles", as used herein, refers to a portion of particulate particles with a size range of 50 nanometers to 2 microns (1 micron is 0.001 millimeter) in the water, for example, the NSF defines the fine particulate portion of lead particle size between 0.1 to 1.2 microns in water.

The term "suspended particles" refers to particulate size larger than 2 microns.

The term "gravity-fed or gravity-flow" filtration refers to the flow of a fluid through a filtration media wherein gravity is substantially the only motive force acting upon the fluid to force the fluid through the filtration media.

The term "low pressure flow" filtration refers to the flow of a fluid through a filtration media wherein the pressure of fluid within 30 psi or less is the motive force to move the fluid through the filtration media.

The term "nanofiber" or "nanofibers" refers to a fiber having a diameter or average diameter less than about 2.0 microns. In a preferred embodiment, the diameter or average diameter of nanofibers is less than 1000 nanometers.

The term "dispersion of nanofibers" shall mean a nanofiber or nanofibers are dispersed in a solvent comprising of a water, an aqueous, an organic solvent or any combination therein, the total nanofibers in a dispersion is not more than 10% by dry weight, preferably, not more than 5%.

The term "granular filtration media" (GFM) shall mean the porous and or nonporous, dry or moisture-containing granular filtration media particles having the particle size or average particle size in the range of 100-2000 microns.

In one embodiment of the present invention, provides a granular filtration media mixture comprising of a mixture of a granular filtration media (GFM) and less than 5% of nanofibers based on the dry weight, and the moisture content is in a range of 3% to 70% by weight.

A granular filtration media (GFM) could be porous and or nonporous, dry or moisture-containing, granular filtration media particles having moisture content in the range of 3%-70%, having the particle size or average particle size in the range of 100-2000 microns. In a preferred embodiment, the moisture content in the range of 3%-60%, particle size or average particle size distribution is in the range of 200-2000 microns. In a most preferred embodiment of the present invention, the particle size or average particle size distribution is in the range of 300-1500 microns. Examples of granular filtration media includes without being limited to, activated carbon particles, granular activated carbon (GAC), functionalized granular activated carbon, silica gel, sand, fractured anthracite coal, ion exchange resin beads, ion exchanger-based hybrid particles such as iron oxide hydroxide hybrid ion exchange hybrid described in U.S. Pat. Nos. 7,504,036; 7,291,578; 7,708,892, polymeric adsorbent resins such as Amberlite™ XAD type of polymeric adsorbents, activated alumina, zeolites, clay minerals, synthetic molecular sieves, KDF process filtration media (Cu—Zn formulations), aluminosilicates, titanates, bone char, ceramic, diatomaceous earth (DE) or metal oxide-hydroxide impregnated DE (traded name—NXT-2 media further described in U.S. Pat. No. 8,110,526), or any combinations of thereof. In a preferred embodiment, the granular filtration media is selected from ion exchange resin particles; zeolites; activated carbon particles (granular activated carbon); synthetic molecular sieve particles; diatomaceous earth; silica; clay, etc.

Nanofibers include without being limited to, synthetic polymeric nanofiber, natural polymeric nanofiber, derivatives of natural polymeric nanofibers, inorganic nanofibers or any combinations of thereof. The nanofiber or nanofibers refers to a fiber having a diameter or average diameter in a range of 5 nanometers to 2.0 microns; in a preferred embodiment, having a diameter or average diameter in a range of 10 to 1000 nanometers; in a most preferred embodiment, having a diameter or average diameter in a range of 20 to 800 nanometers, between 100 and 700 nanometers, between 200 and 500 nanometers, or between 300 and 400 nanometers. In an embodiment, the length of the nanofiber is between 1 mm and 20 mm, between 2 mm and 10 mm, between 3 mm and 8 mm, or between 4 and 6 mm. In one embodiment, the nanofibers in the granular filtration media mixture is in the range of 0.01% to 5% by dry weight, preferably, in a range of 0.04-3% by dry weight.

A "granular filtration media mixture" can include one or more types of the granular filtration media and one or more types of the nanofibers described herein.

Examples of a nanofiber for the present invention includes without being limited to, nano synthetic polymeric fiber, nano engineered-resin fiber, nano ceramic fiber, nanofibrillated or microfibrillated cellulose fiber, nano chitin fiber, nano chitosan fiber, derivatives of nano cellulose fiber, nano rayon fiber, nano glass fiber, nano alumina fiber, nano aluminahydroxide fiber, nano titania fiber, nanocarbon tube, nanocarbon fiber, or nano activated carbon fiber, nano silica fiber, nano zeolite fiber, or any combination of thereof.

The nanofibers can generally be produced by interfacial polymerization, electro spinning, and forcespinning from different materials. The most common process for nanofiber preparation is electrospinning, also known as electrostatic spinning, refers to a technology which produces fibers from a polymer solution or polymer melt using interactions between fluid dynamics, electrically charged surfaces and electrically charged liquids. The book "Electrospinning of Micro- and Nanofibers; Fundamentals and Applications in Separation and Filtration Processes" by Y. Filatov, A. Budyka, and V. Kirichenko is devoted to the scientific and technical aspects of electrospinning process. More than 100 different polymers both synthetic and natural can be electrospun into nanofibers, mostly from polymer solution, some examples includes without being limited to, polyacrylonitrile (PAN), poly(ethylene oxide) (PEO), poly(ethylene terephthalate) (PET), polystyrene (PS), poly(vinylchloride) (PVC), Nylon-6, poly(vinyl alcohol) (PVA), poly(E-caprolactone) (PCL), Kevlar [poly(p-phenylene terephthalamide), or PPTA], poly(vinylidene fluoride) (PVDF), polybenzimidazole (PBI), polyurethanes (PUs), polycarbonates, polysulfones, poly(vinyl phenol) (PVP), microfiburous cellulose, carboxymethylcellulose, polylactic acid, chitin, chitosan, collagen, gelatin, polyaniline, block copolymers as shown for the example of styrene-butadiene-styrene triblock copolymers, nano carbon fibers, electrospun titania (TiO2) nanofibers, alumina nanofibers, ceramic nanofibers, et al.

In a preferred embodiment of the present invention, a nanofiber or nanofibers are selected from nano cellulose fiber, nanofibrillated cellulose fiber (NFC), microfibrillated cellulose fiber (MFC), nano chitin fiber, nano chitosan fiber, nano collagen fiber, nano geltin fiber, derivatives of cellulose nanofibers, nano poly(vinyl alcohol) (PVA) fiber, nano polyacrylonitrile (PAN) fiber, nano carbon fibers, electrospun titania (TiO2) nanofibers, alumina nanofibers, alumina hydroxide nanofibers, ceramic nanofibers, or any combination of thereof.

In a more preferred embodiment of the present invention, a nanofiber or nanofibers are selected from nano cellulose fiber, nanofibrillated cellulose fiber (NFC), microfibrillated cellulose fiber (MFC), derivatives of nanocellulose fiber, derivatives of cellulose nanofiber, nano chitin fiber, nano chitosan fiber, or any combination of thereof.

In the most preferred embodiment to the present invention, a nanofiber or nanofibers are selected from nanocellulose fiber, nanofibrillated cellulose fiber (NFC), microfibrillated cellulose fiber (MFC), derivatives of nanocellulose fiber, derivatives of cellulose nanofiber or any combination of thereof. A nano cellulose fiber comprising of nanosized cellulose fibrils with a high aspect ratio, is also referred to as microfibrillated cellulose (MFC); cellulose microfibrils; fibrillated cellulose; nanofibrillar cellulose (NFC); fibril aggregates; nanoscale cellulose fibrils; microfibrillated cellulose nanofibers; cellulose fibril aggregates; cellulose nanofibers (CNF); cellulose nanofibrils; cellulose microfibers; microfibril aggregates; cellulose microfibril aggregates; cellulose fibrils; nanofibrillated cellulose (NFC); microfibrillar cellulose; nanowhiskers; nanocrystalline cellulose (NCC). The nanofibrillated cellulose fiber (NFC) can be prepared by methods, including homogenization of pulp fibers; grinding discs; Cryocrushing; high-intensity ultrasonication; electroospinning, etc. Its preparation and properties are also disclosed in U.S. Pat. Nos. 4,374,702; 4,483,743; 4,481,077, and a variety of uses are described in U.S. Pat. Nos. 4,341,807 and 4,378,381, et al, hereby incorporated by reference.

In one embodiment of the present invention, the moisture content in the blended or mixed granular filtration media with nanofibers is in the range of 3% to 70% by weight; preferably, in a range of 5 to 65%; more preferably, in a range of 5% to 60%, in the range of 10% to 60%, in the range of 20% to 50%, in the range of 30% to 40%, or in the range of 35% to 45%.

In another embodiment, further provides the method of preparing a granular filtration media mixture comprising the steps of:
a. Dispersing the nanofiber in a solvent composition to prepare a nanofiber dispersion. The dry nanofiber or wet cake nanofiber is added into and further dispersed by vigorously agitation or mixing, such as by homogenizer in a solvent composition for a period of time from 2-60 minutes. A solvent composition includes but not limited to water, aqueous solution, organic solvent, or any combination of them with or without dispersant added first. The concentration of nanofiber in the final dispersion is not more than 10% in the dispersion, preferably, not more than 5%.
b. Adding the conventional granular filtration media into the nanofiber dispersion and admix them together for a period of time from 2-60 minutes. Then separate the blended granular media by filtration. The final granular filtration media mixture product could be used as it is or to be further dried to not less than 90%, 80%, 75%, 70%, 65%, 60%, 55%, 50%, 45%, 40%, 35%, 30%, 25%, 20%, 15%, 10%, 5%, or 3% of moisture content.

In one embodiment of the present invention, provides a method of use of the granular filtration media mixture comprised of nanofibers to remove contaminants from water source (e. g. drinking water, industrial water, environmental water, recreational water) by contacting the water with the granular filtration media mixture with or without combination of other filtration media for the purpose of water purification.

The contaminants which can be removed by contact with the mixture media of the present invention, include without being limited to: particulate particles, colloidal particles, fine particles, suspended particles, organic, residual halogen such as residual chlorine or residual bromine, selenium, arsenate, arsenite, fluoride, dichromate, manganese, tin, platinum, iron, cobalt, chromate, molybdate, selenite, senelate, uranium, vanadium, vanadate, ruthenium, antimony, molybdenum, tungsten, barium, cerium, lanthanum, zirconium, titanium, and or radium, zinc, copper, lead, mercury, cadmium, as well as natural organic matter (NOM), pesticide and herbicide residues, endocrine disruptors, pharmaceutical residues and organic compounds released through industrial discharges. The particles include without being limited to: particles of lead, copper, iron oxides, ironoxyhydroxide, silica, et al. The contaminated water source includes without being limited to: tap water from municipal supplies or rural wells; municipal water treatment; recreational water from a pool or spa; environmental water; industrial process water; industrial waste water; municipal waste water; agriculture irrigation water. The treated water can be used for drinking, industrial process, agriculture application or waste water discharge. The preferred water treatment application for use of a granular filtration media mixture comprising a granular filtration media and nanofibers is point-of-use, point-of-entry and municipal water treatment for drinking water purification.

In a preferred embodiment, the metal contaminants include without being limited to zinc, copper, lead, mercury, cadmium, iron, cobalt, chromate, dichromate, manganese, tin, etc.

The contaminant particles from the water source include without being limited to, particulate particles, colloidal particles, fine particles, suspended particles, which widely exist in the contaminated water. Those contaminant particles could come from:

Detached soil, mineral, or contaminant particles in water source.

Solutes undergoing geochemical precipitation due to changes in redox conditions from mixing with injected or percolated surface water.

Emulsions of fine droplets from free phase hydrocarbons in the water.

Agglomerations forming micelles seeded by macromolecules such as humic acids in the water.

Colloids introduced directly into the groundwater from landfills or other surface sources.

For example, on a mass basis, the colloid concentrations in a groundwater can range from 1 to 75 mg/L.

More preferably, the contaminant particles from a water source include without being limited to, iron oxides, iron oxide hydroxides, silica, lead, copper, etc.

In a most preferred embodiment of the present invention, a particulate particles of heavy metal contaminant in water is lead which exists in a variety of inorganic forms in water. The most common forms of inorganic particulate lead in water are lead carbonate (PbCO3), lead hydroxide [Pb(OH)2], and lead hydroxycarbonate [Pb3(OH)2(CO3)2]. Ion forms of lead that may exist in water are Pb2+, PbOH+, and Pb(OH)3-. Lead ion may complex with natural organic matter (NOM) in water, such as humic acid, tannins, and fulvic acids. Furthermore, the lead is subject to adsorption onto particles in water and ion exchange with clay particles. As the pH within the range of pH of drinking water and carbonate concentration in the water increase, the solubility of lead decreases, and further generated insoluble particulate lead.

More specifically, according to NSF/ANSI 53 protocol (2011a published April 2012), which defined a protocol to determine the lead in the water, the first portion representing the total lead [Pbt] sample (from influent or effluent) must be transferred immediately to a sample bottle that contains adequate nitric acid to lower the pH of the sample to below 2.0 for the total lead determination. A second portion of the sample (from the same influent or effluent) collected must be immediately passed through a 0.1 micron absolute filter and collected into a sample bottle that contains adequate nitric acid to lower the pH of the sample below 2.0. This sample is collected to determine the 0.1 micron filtrate lead, [fPb0.1]. A third portion of the sample (from the same influent or effluent) must be immediately passed through a 1.2 micron absolute filter and collected into a sample bottle that contains adequate nitric acid to lower the pH of the sample below 2.0. This sample is 1.2 micron filtrate lead sample, [fPb1.2].

The total particulate lead [Pbtp] is calculated as follows:

$$[PBTP]=[PBT]-[FPB0.1].$$

The percent of total particulate lead % [Pbtp] is calculated as follows:

$$\%[PBTP]=\{[PBT]-[FPB0.1]\}/[PBT]\times 100.$$

The fine particulate lead [Pbf] is defined as the portion of total particulate lead between 0.1 and 1.2 micron in size (fine), and calculated as follows:

$$[PBF]=[FPB1.2]-[FPB0.1].$$

The percent of fine particulate lead % [Pbf] is calculated as follows:

$$\%[PBF]=\{[PBF]/[PBTP]\}\times 100.$$

The standard NSF 53 pH 8.5 particulate lead testing water is also specifically defined in the NSF/ANSI 53 protocol (2011a published April 2012). Illustrative source water specifications according to the NSF/ANSI 53 protocols (2011a published April 2012) are described as follows: hardness of 90-110 mg/L, alkalinity of 90-110 mg/L, total chlorine of 0.25-0.75 mg/L, pH of 8.3-8.6. The testing water must contain the overall average of 150±15 ppb of total lead, and the total particulate lead (lead % [Pbtp]) in the testing water is allowed on overall average of 20-40%, and the testing water must also contain the overall average of more than 20% of % [Pbf] which is the portion of total particulate lead that is between 0.1 and 1.2 microns in size (fine particle size).

Figure 1:
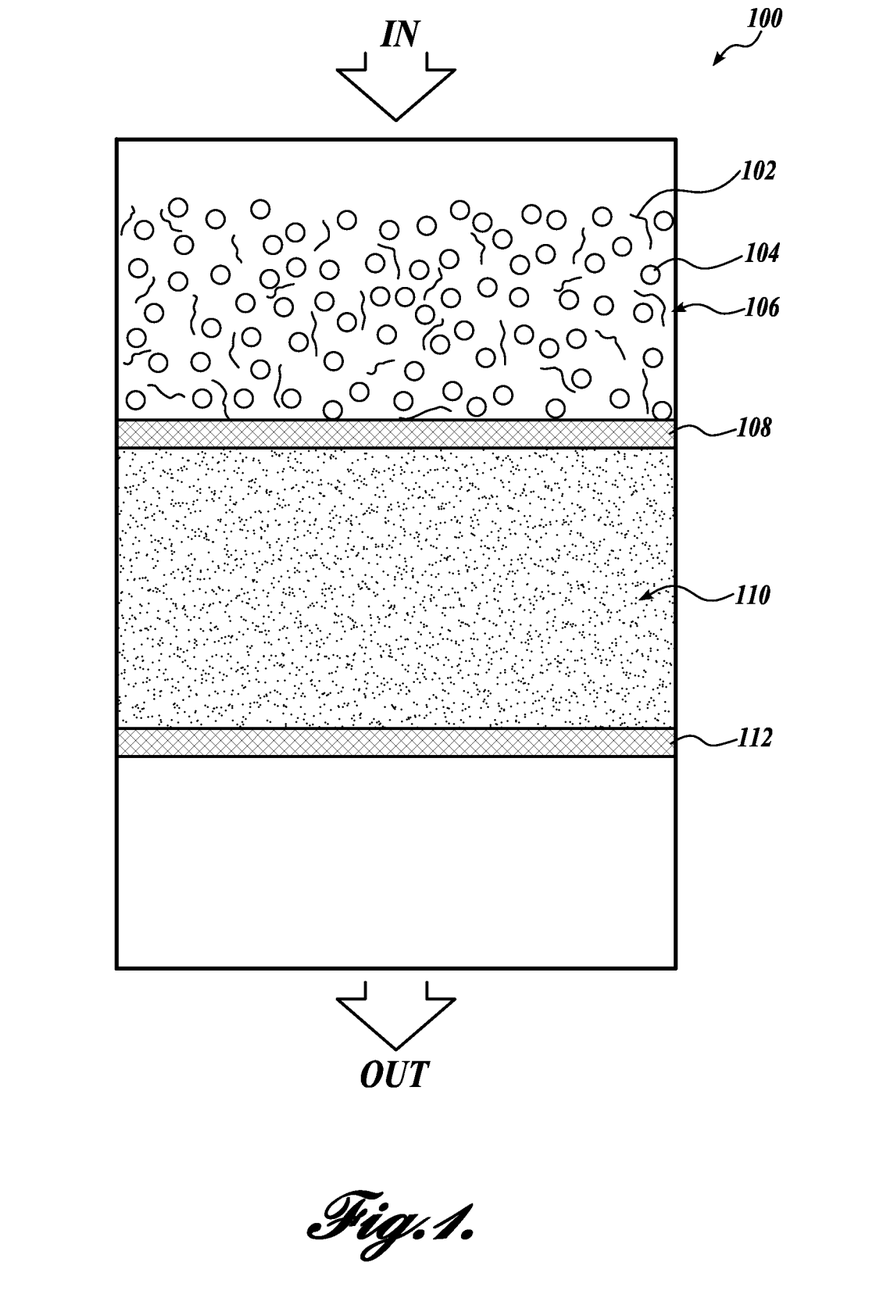
FIG. 1 is a schematic illustration of an embodiment of a filter.

Referring to FIG. 1, a filter 100 in accordance with some embodiments is schematically illustrated. The filter 100 includes a first upper chamber 106 and a second lower chamber 110 separated by a screen 108. The screen 108 is optional in some embodiments. As depicted by the arrows, the water to be filtered can flow from the top of the filter and exit from the bottom of the filter. The filter 100 can for example, be connected to the entry of a collection jug, wherein the unfiltered water can be poured over the top of the filter 100, so that water flows under the force of gravity through the filter 100 into the jug.

In some embodiments, the upper chamber 106 has a first media layer comprising of a mixture of granular filtration media 104 and nanofibers 102. The nanofibers 102 can be placed in the interstitial spaces between the individual granular particles 104. In other embodiments, the lower chamber 110 can include the mixture of granular filtration media 106 and nanofibers 102. In some embodiments, the filter 100 can include a single chamber having the mixture of granular filtration media 104 and nanofibers 102. As can be seen in FIG. 1, the nanofibers 102 partially fill the voids that are created between the granular filtration media 104. For example, the void fraction of the granular filtration media alone without nanofibers can be in the range of 0.02 (2%) to 0.07 (70%). However, when the nanofibers are combined with the granular filtration media, the void fraction is reduced to the range of 0.01 (1%) to 0.65 (65%). In an embodiment, the void fraction is reduced to the range of 0.02 (2%) to 0.5 (50%). In another embodiment, the void fraction is reduced to the range of 0.30 (30%) to 0.4 (40%). An advantage of the nanofibers is the ability to retain certain fine particles and colloidal particles that would otherwise pass unfiltered due to the void space of the granular filtration media alone. The nanofibers also do not significantly decrease the flow through the filter. Accordingly, an adequate flow of water can be induced solely through the force of gravity or through low pressure applications.

In some embodiments, the lower chamber 110 is filled with a second granular filtration media and the second granular filtration media is supported on a second screen 112.

The granular filtration media 104 of the upper chamber 106 can include, but, is not limited to any of the granular filtration media described herein and having the properties as also described herein. The nanofibers 102 can include any of the nanofibers described herein and having the properties as also described herein. The second filtration media of the second lower chamber 110 can include, but, is not limited to zeolites, ion exchange resin, and silica.

Figure 2:
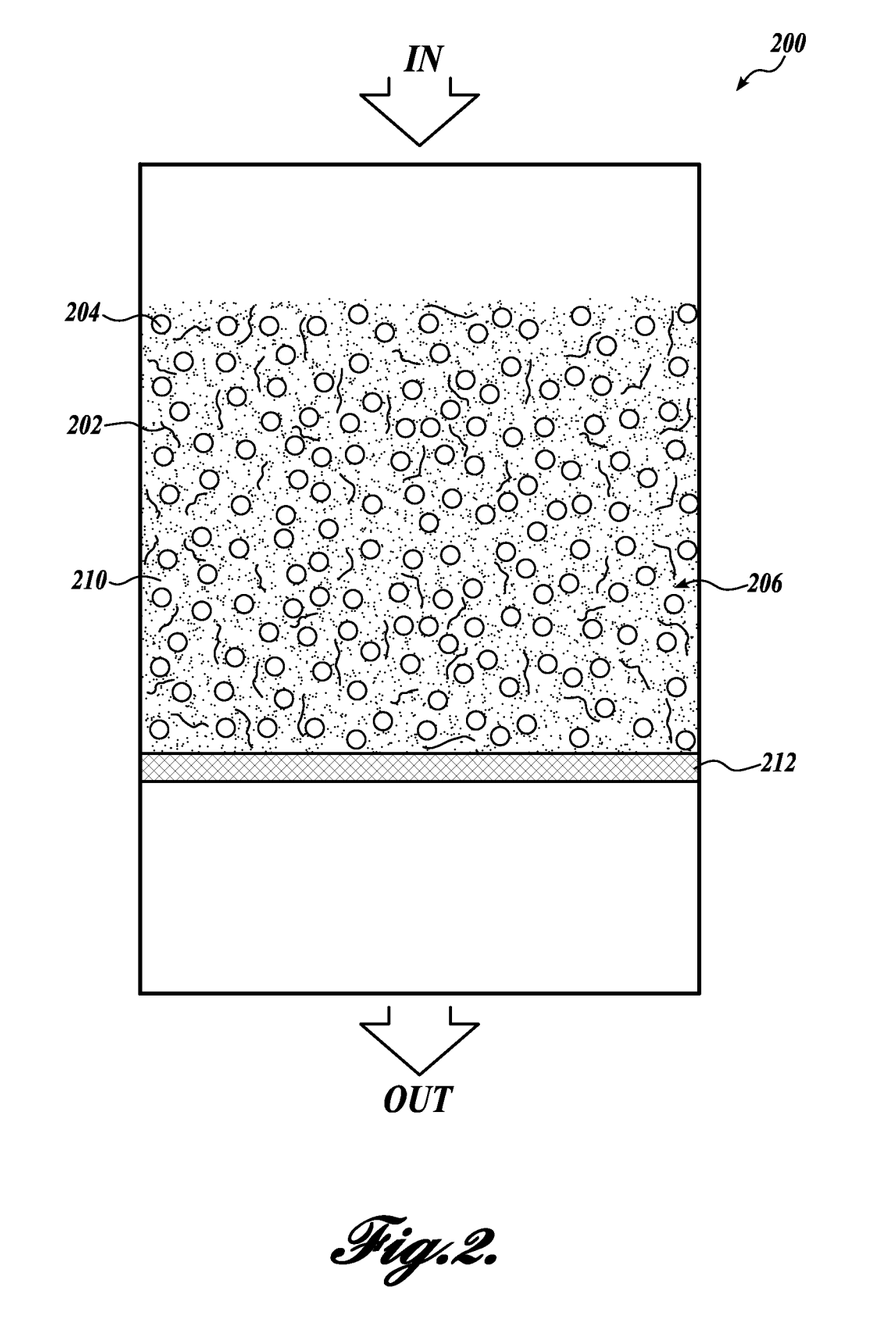
FIG. 2 is a schematic illustration of an embodiment of a filter.

Referring to FIG. 2, another filter 200 in accordance with some embodiments is illustrated. As can be seen in FIG. 2, the filter 200 includes a single chamber 206 with a single layer of filtration media supported by the screen 212. In the embodiments of FIG. 2, the screen separation the first and second filtration media has been removed.

As with the embodiments of FIG. 1, the embodiments of FIG. 2 also include a mixture of granular filtration media 204 and nanofibers 202. In addition, the filtration media can include additional filtration media 210 corresponding to the filtration media 110 of the second chamber in FIG. 1. That is, additional filtration media, such as zeolites, ion exchange resin, and silica, can be combined with the granular filtration media 204 and nanofibers 202.

The granular filtration media 204 can include, but, is not limited to any of the granular filtration media described herein and having the properties as also described herein. The nanofibers 202 can include any of the nanofibers described herein and having the properties as also described herein. The filtration media 210 corresponds to the filtration media of the second lower chamber 110 shown in FIG. 1. That is, the filtration media 210 can include, but, is not limited to zeolites, ion exchange resin, and silica.

In the embodiments of FIG. 2, the nanofibers 202 can reduce the porosity and void space created by the granular filtration media and the second media 210. For example, the void fraction of the granular filtration media alone without nanofibers can be in the range of 0.02 (2%) to 0.07 (70%). However, when the nanofibers are combined with the granular filtration media, the void fraction is reduced to the range of 0.01 (1%) to 0.65 (65%). In an embodiment, the void fraction is reduced to the range of 0.02 (2%) to 0.5 (50%). In another embodiment, the void fraction is reduced to the range of 0.30 (30%) to 0.4 (40%). An advantage of the nanofibers is the ability to retain certain fine particles and colloidal particles that would otherwise pass unfiltered due to the void space of the granular filtration media alone. The nanofibers also do not significantly decrease the flow through the filter. Accordingly, an adequate flow of water can be induced solely through the force of gravity or through low pressure applications.

In one embodiment of the present invention, provides a water filter comprising of a mixture media of granular filtration media and nanofibers alone described as above, or any combination with other granular filtration media component which could be porous and or nonporous, dry or moisture-containing, having the particle size or average particle size in the range of 100-2000 microns. In a preferred embodiment, the particle size or average particle size distribution of other granular filtration media is in the range of 250-2500 microns, more preferably, the particle size or average particle size distribution in the range of 300-1000 microns. Examples of other filtration media includes without being limited to, activated carbon particles, granular activated carbon (GAC), silica gel, sand, fractured anthracite coal, ion exchange resin beads, granular hybrid of activated carbon with metal oxides, functionalized granular activated carbon, ion exchanger-based hybrid particles such as iron oxide hydroxide hybrid ion exchange hybrid described in U.S. Pat. Nos. 7,504,036; 7,291,578; 7,708,892, polymeric adsorbent resins such as Amberlite™ XAD type of polymeric adsorbents, activated alumina, zeolites, clay minerals, synthetic molecular sieves, KDF process filtration media (Cu—Zn formulations), aluminosilicates, titanates, bone char, ceramic, diatomaceous earth (DE) or metal oxide-hydroxide impregnated DE (traded name—NXT-2 media further described in U.S. Pat. No. 8,110,526), or any combinations of thereof. In a preferred embodiment, the granular filtration media is selected from ion exchange resin particles; zeolites; activated carbon particles (in with or without functionalization); synthetic molecular sieve particles; diatomaceous earth; silica; clay.

A water filter of the present invention can be prepared by filling a mixture comprising the granular filtration media and nanofibers into a filter cartridge chamber or a filter bed or a filtration vessel, with or without screen, one layer or multiple-layers with or without combination of other filtration media. The water contaminants can be removed by allowing a contaminated water to flow through the filter cartridge or the filter bed to remove the contaminants for the purpose of water purification. More specifically, the water filter can be designed or provided as a gravity-fed or a low pressure-fed filtration cartridge, filtration bed, and or filtration column to remove the contaminants from water for water purification application.

Specifically, the water filter of the present invention can be used in a tap water from municipal supplies or rural wells; point-of-use; point-of-entry; municipal water treatment; recreational water from a pool or spa; environmental water; industrial process water; industrial waste water; municipal waste water and agriculture irrigation water to remove contaminants, including without being limited to: particulate particles, colloidal particles, fine particles, suspended particles, organic, residual halogen, selenium, arsenate, arsenite, fluoride, dichromate, manganese, tin, platinum, iron, cobalt, chromate, molybdate, selenite, senelate, uranium, vanadium, vanadate, ruthenium, antimony, molybdenum, tungsten, barium, cerium, lanthanum, zirconium, titanium, and or radium, zinc, copper, lead, mercury, cadmium, as well as natural organic matter (NOM), pesticide and herbicide residues, endocrine disruptors, pharmaceutical residues and organic compounds released through industrial discharges.

In one preferred embodiment, the invention provides a water purification filter comprised of the first layer media by admixing two different granular filtration media with nanofibers and a second layer of granular filtration media, with or without a screen to separate the first media and the second media, or just a blend the first and second media layers. Preferably, the first filtration media layer provided by this invention is selected from any mixture combinations of nanofibers admixed with any combinations of activated carbon particles (including functionalized and/or treated), zeolite, ion exchange resin, or silica, etc. The second filtration media layer is selected from ion exchange resin, zeolite. The screen to separate the first media and the second media has mesh size more than 70. This filter can be further designed, produced or used in a gravity flow and or a low pressure flow cartridge, to remove chemical contaminants including without being limited to, organic matters, copper, zinc, mercury, cadmium, lead, residual halogen such as residual chlorine or residual bromine in the drinking water source. This filter can be used in the point-of-use and point-of-entry, some examples include without being limited to, pour-through carafes, water coolers and refrigerator water tanks, and pitchers, etc.

In one aspect, the inventions described herein can be used to remove particular and soluble lead from drinking water using a gravity fed or low pressure device. In an embodiment, the total lead amount in the purified water is below 10 ppb for 300 L of water.

As there is a dynamic equilibrium between soluble and particulate lead species, the particulate lead species shifts back and forth to soluble lead. This equilibrium is affected by the concentration of soluble lead in solution and also by the pH of the water. Depending on the size, soluble lead can be called colloidal.

In an aspect, the present invention describes a granular filtration media mixture of granular filtration media and nanofibers which has the advantage of trapping the smaller sized lead into the pores of the granular filtration media and trapping the larger sized lead particles in the granular filtration media mixture fibril mesh. In an embodiment, the smaller lead is also trapped in the mesh.

In an aspect, the inventions described herein can utilize this equilibrium to remove particulates and colloidal lead from the water. Using a granular filtration media mixture, particulate leads are adsorbed in the granular filtration media mixture until they become soluble. At that point, a third media, such as for example, ion exchange media ("IXR") can exchange the soluble lead for sodium or hydrogen. Granular filtration media mixture forms a net or matrix or mesh that retains or binds the colloidal and particulate lead. In an aspect the NFC can be, for example, lyocell fiber (from wood pulp), 3-6 mm length, degree of fibrillation of 40-300 mL, and average diameter of 0.3 microns. Other forms of NFC can also be used. The GAC mesh size can be either one single mesh (i.e., 18, 20, 25, or 30) or a range (e.g 8×50, 12×40, or 20×50) with 16×50 being the preferred. The fibril net/matrix/mesh formed during the manufacture of the granular filtration media mixture is, among other things, related to the amount of moisture ("% MC") present in the final composite. The higher the % MC the higher the lead removal by the net, but the slower the flow rate of the water is passing through it. The ideal % MC is in the range of about 40 and about 70%. The % MC can also be in the range of about 45% MC to about 65% MC; from about 50% MC to about 60% MC; or about 65% MC. An IXR particle size of about 500 to 800 microns; about 550 to 750 microns; about 600 to 700 microns; about 650 to 900 microns; about 650 to 790 microns; or about 730 to 780 microns; can be used. In an embodiment the granular filtration media mixture composite is very uniform in composition or is not uniform in composition.

In an embodiment, the particulate lead is trapped in the fibril net/matrix/mesh formed during the manufacture of the granular filtration media mixture converts to soluble lead and is then exchanged by the IXR to sodium and hydrogen. In another embodiment, a potassium buffer may be advantageous in the lead removal or reduction.

In another aspect, the nanofiber of the mixture is between about 0.05 to about 0.8 g nanofiber per 130 mL of the granular filtration media mixture. In an embodiment the lower end of the range is about 0.06 to about 0.3 and the upper end of the range is about 0.31 to about 5.0 g nanofiber per 130 mL of the granular filtration media mixture In an embodiment, the amount of lead in the resulting filtered water is below about 50 ppb, below about 47 ppb, below about 45 ppb, below about 42 ppb, below about 40 ppb; below about 37 ppb; below about 35 ppb; below about 32 ppb; below about 30 ppb; below about 27 ppb; below about 25 ppb; below about 22 ppb; below about 20 ppb; below about 19 ppb; below about 18 ppb; below about 17 ppb; below about 16 ppb; below about 15 ppb; below about 14 ppb; below about 13 ppb; below about 12 ppb; below about 11 ppb; below about 10 ppb; below about 9 ppb, below about 8 ppb, below about 7 ppb, below about 6 ppb, below about 5 ppb, below about 4 ppb, below about 3 ppb, below about 2 ppb, or below about 1 ppb.

While illustrative embodiments have been illustrated and described, it will be appreciated that various changes can be made therein without departing from the spirit and scope of the invention.

EXAMPLES

Example 1 Particulate Lead Removal Testing of Mixture of GAC and NFC

1) Material and Reagents:
Nanofibrillated cellulose (NFC) wet cake supplied by Engineered Fiber Technologies, LLC.
Granular activated carbon (GAC): 12×40 mesh acid washed, supplied by Filtrex Technology, India.
Lead (II) nitrate: Sigma-Aldrich, ACS reagent
Sodium Bicarbonate: VWR, ACS reagent
Magnesium Sulfate Heptahydrate: Sigma-Alich, ACS reagent
Chloride Dihydrate: EMD Chemicals, >99.0% 1.0 N Sodium Hydroxide solution, lab made.
Deionized water (DI): resistivity>1.0 MΩ-cm (conductivity<1 μS/cm)
VWR Filter paper 417 (pore size 40 μm), supplied by VWR.
Pall Arcodisc 32 mm syringe filter with 0.1 μm Super membrane, Pall Corporation
Plastic column: 7.5 cm diameter.

2) Stock Solution for Particulate Lead Solution Preparation

The following stock solutions were prepared with ultra-pure water according to the NSF/ANSI 53 protocol (2011a published April 2012). Calcium Chloride solution (38 g/L); Magnesium sulfate solution (32 g/L); Sodium bicarbonate solution (63 g/L); Soluble lead stock solution (3.6 g/L with 4 mL of 1:1 diluted Nitric Acid); Insoluble lead stock solution (1.6 g/L, pH<6.5).

3) The Preparation of Standard NSF53 pH 8.5 Particulate Lead Testing Water

The standard NSF 53 pH 8.5 particulate lead testing water is prepared as defined in the NAF/ANSI 53 protocol (2011a published April 2012). Illustrative source water specifications according to the NSF/ANSI 53 protocols (2011a published April 2012) are as follows: hardness of 90-110 mg/L, alkalinity of 90-110 mg/L, total chlorine of 0.25-0.75 mg/L, pH of 8.3-8.6.

The testing water contains the average 150±15 ppb of total lead with 20-40% of total lead being particulate lead which is greater than 0.1 μm according to NSF/ANSI 53 protocol (2011a published April 2012).

The procedure to prepare 5 L of the testing water is described as below:
1) Into 5 L plastic container, 5 L of DI water was added and stirred at moderate speed.
2) 13.2 mL each of magnesium sulfate solution, calcium chloride solution and sodium bicarbonate solution was added sequentially into the 5 L solution under moderate speed mixing.
3) 55 μL of commercial bleach was added to the solution.
4) The pH of the solution was adjusted to pH 8.5 (pH 8.3-pH8.6) with 1.0N sodium hydroxide solution under mixing.
5) Total available chlorine (TAC) was checked in the range of 0.25-0.75 mg/L TAC using HACH Spectrophotometer.
6) 264 μL of soluble lead stock solution was added to the solution under mixing. 7) 13.2 mL of the solution was transferred into a 25 mL plastic container. 8) The solution in the 25 mL plastic container was mixed rapidly, followed by adding 264 μL of insoluble lead stock solution into the 25 mL plastic container, continue rapid mixing for 60 second, and then immediately transferred the solution into the 5 L plastic container under moderate mixing. 9) The 5 L of particulate lead testing water in 5 L plastic container was used as fresh immediately for Lead removal testing.

4) The Preparation of Particulate Lead Testing Water Formulation

The additional particulate lead can be added into the above standard NSF 53 pH 8.5 particulate lead testing water to further increase the particulate lead concentration by following the same procedure as the above that the particulate lead was added to the initial test water. The final particulate lead testing water is used as fresh for lead removal testing.

5) Preparation of Mixture of GAC and NFC

Into 150 mL of Deionized water, 1.0 g of NFC wet cake (0.2 g dry weight of NFC) was added while vigorously agitating, and then maintained the vigorous mixing for another 30 minutes, the NFC-water dispersion was obtained. Followed by adding 50 grams of GAC, and maintained the moderate agitating for another 10 minutes to blend the GAC and NFC in the water. The final mixture of GAC and NFC was obtained by filtration and further was tested as the following column testing. Another blank GAC sample was made by adding GAC into 150 mL of deionized water and followed by the moderate mixing for 10 minutes, and the final blank GAC sample was obtained by filtration, and further was tested as following column testing.

6) The Column Set Up for the Column Testing of Particulate Lead Removal.

Into a plastic column with 7.5 cm diameter, a filter paper with 40 micron pore size was placed at the bottom of the column to prevent particles or NFC from escaping from the column and further contaminating the effluent. Followed by placing the whole mixture of GAC and NFC prepared as above, then the same filter paper was also placed on the top of the media in the plastic column. The blank GAC testing column was set up as the same procedure only replacing the mixture media of GAC and NFC by blank GAC prepared as the above prepared.

7) The Column Testing of Particulate Lead Removal

According to NSF/ANSI 53 protocol (2011a published April 2012), the first portion representing the total lead [Pbt] sample (from influent or effluent) shall be transferred immediately to a non-glass sample bottle that contains adequate nitric acid to lower the pH of the sample to below 2.0. A second portion of the sample (from the same influent or effluent) collected from the non-glass sampling vessel shall be immediately passed through a 0.1 micron absolute filter and collected into a non-glass sample bottle that contains adequate nitric acid to lower the pH of the sample below 2.0. This sample is the 0.1 micron filtrate lead sample [fPb0.1].

The total particulate lead [Pbtp] shall be calculated as follows:

[Pbtp]=[*Pbt*]−[*fPb*0.1].

The particulate lead testing water prepared as above item 3. The initial influent for the 1st liter of column testing was sampled first for the total lead and total particulate lead analysis in a plastic container which had nitric acid as preservative before the column testing was started, immediately followed by gravity-fed the 1st liter of influent particulate lead testing water respectively into the columns filled by mixture of GAC and NFC, or blank GAC, and then allowed the testing water flow through the columns by gravity-fed. The whole effluent samples were collected in a 1 L of plastic container respectively from each column, and further prepared for samples for total lead and total particulate lead analysis.

After the 1st liter of lead testing water sample completely passed through the columns, instantly followed by repeating the same procedure for letting the 2nd liter of testing water flow through the columns.

The lead determination was conducted by EPA 200.8 method, which was entitled "Determination of Trace Elements in waters and wastes by inductively coupled plasma-mass spectrometry".

The following table 1 listed the particulate lead removal results from mixture of GAC and NC.

TABLE 1

The particulate lead removal testing of mixture of GAC and NFC

| Testing water | Items | Blank GAC | | | Mixture of GAC and NFC | | |
|---|---|---|---|---|---|---|---|
| | | $1^{st}$ L | $2^{nd}$ L | Average | $1^{st}$ L | $2^{nd}$ L | Average |
| Influent | Total Pb (ppb) | 272 | 281 | 276.5 | 272 | 281 | 276.5 |
| | 0.1 micron filtrate Pb (ppb) | 171 | 164 | — | 171 | 164 | — |
| | Total particulate Pb (ppb) | 101 | 117 | 109 | 101 | 117 | 109 |
| | pH | 8.58 | 8.58 | 8.58 | 8.58 | 8.58 | 8.58 |
| Effluent | Total Pb (ppb) | 123 | 141 | 132 | 100 | 117 | 108.5 |
| | 0.1 micron filtrate Pb (ppb) | 57.8 | 64.9 | — | 57.7 | 64.2 | — |
| | Total particulate Pb (ppb) | 65.2 | 76.1 | 70.7 | 42.3 | 52.8 | 47.6 |
| | Total particulate lead removal % | 35.4 | 35.0 | 35.2 | 58.1 | 54.9 | 56.5 |
| | pH | 8.31 | 8.31 | 8.31 | 8.31 | 8.23 | 8.27 |
| | Flow rate (ml/min) | 467 | 476 | 471.5 | 251 | 248 | 249.5 |

The results from table 1 clearly demonstrated that the mixture of GAC and NFC showed much higher total particulate lead removal efficacy than the blank GAC.

Example 2: Particulate Lead Removal Testing of Mixture of Zeolite and NFC

In this example, the raw material zeolite was supplied by Zeotech Corporation under the trade name Zeobrite which was a granular natural zeolite. The mixture of zeolite and NFC was prepared to following the same method as the above example 1 by only replacing the GAC with zeolite. The blank zeolite was prepared by adding zeolite into 150 mL of deionized water and followed by the moderate mixing for 10 minutes, and the final blank zeolite sample was obtained by filtration, and further was tested by the column testing.

All the particulate lead testing water samples were prepared and used as fresh, all the column testing set up and testing procedure were repeated as the example 1.

The following table 2 listed the particulate lead removal results from the mixture of zeolite and NFC.

TABLE 2

The particulate lead removal testing of mixture of zeolite and NFC

| Testing water | Items | Blank zeolite | | | Mixture of zeolite and NFC | | |
|---|---|---|---|---|---|---|---|
| | | $1^{st}$ L | $2^{nd}$ L | Average | $1^{st}$ L | $2^{nd}$ L | Average |
| Influent | Total Pb (ppb) | 184 | 184 | 184 | 184 | 184 | 184 |
| | 0.1 micron filtrate Pb (ppb) | 125 | 125 | — | 125 | 125 | — |
| | Total particulate Pb (ppb) | 59 | 59 | 59 | 59 | 59 | 59 |
| | pH | 8.56 | 8.56 | 8.56 | 8.56 | 8.56 | 8.56 |
| Effluent | Total Pb (ppb) | 45.8 | 61.3 | 53.6 | 43.7 | 56.2 | 50 |
| | 0.1 micron filtrate Pb (ppb) | 34.6 | 43 | — | 39.9 | 47.9 | — |
| | Total particulate Pb (ppb) | 11.2 | 18.3 | 14.8 | 3.8 | 8.3 | 6.1 |
| | Total particulate lead removal % | 81.0 | 69.0 | 75.0 | 93.6 | 85.9 | 89.7 |
| | pH | 8.34 | 8.39 | 8.37 | 8.37 | 8.38 | 8.38 |

The results from table 2 clearly demonstrated that the mixture of zeolite and NFC showed much higher particulate lead removal efficacy than the blank zeolite.

Example 3: Particulate Lead Removal Testing of Mixture of Ion Exchange Resin and NFC In this example, the raw material ion exchange resin (IER) beads Amberlyst 15 (strong acidic cationic exchanger) was supplied by Dow Chemical Co. The Amberlyst 15 was first converted from proton type into sodium type by mixing it within 1 N of sodium hydroxide solution.

Wood cellulose fine powder Fiber Clear (FC), was supplied by Fiber Clear, Inc. The media mixture of IER and NFC, and the mixture media of IER and Fiber Clear (FC) was respectively prepared by repeating the procedure of item 5 of the example 1 by only respectively replacing GAC by IER or replacing NFC by FC.

The blank IER was prepared by respectively adding IER into 150 mL of deionized water and followed by the moderate mixing for 10 minutes, and the final blank IER was obtained by filtration, and further was tested by the column testing.

All the particulate lead testing water samples were prepared and used as fresh, all the column testing set up and procedure were repeated as the example 1.

The following table 3 listed the particulate lead removal results from the mixture of IER and NFC, and the mixture of IER and Fiber Clear.

TABLE 3

The particulate lead removal testing of mixture of IER and NFC

| Testing water | | IER | | | Mixture of IER and NFC | | | Mixture of IER and Fiber Clear | | |
|---|---|---|---|---|---|---|---|---|---|---|
| | Item | $1^{st}$ L | $2^{nd}$ L | Average | $1^{st}$ L | $2^{nd}$ L | Average | $1^{st}$ L | $2^{nd}$ L | Average |
| Influent | Total Pb (ppb) | 216 | 216 | 216 | 216 | 216 | 216 | 216 | 216 | 216 |
| | 0.1 micron filtrate Pb (ppb) | 104 | 104 | 104 | 104 | 104 | 104 | 104 | 104 | 104 |
| | Total particulate Pb (ppb) | 112 | 112 | 112 | 112 | 112 | 112 | 112 | 112 | 112 |
| | pH | 8.52 | 8.52 | 8.52 | 8.52 | 8.52 | 8.52 | 8.52 | 8.52 | 8.52 |
| Effluent | Total Pb (ppb) | 74.8 | 95.5 | 85.2 | 12.9 | 23.4 | 18.15 | 61.3 | 82.2 | 71.75 |
| | 0.1 micron filtrate Pb (ppb) | 18.9 | 22.8 | 20.9 | 7.8 | 14.7 | 11.25 | 16.1 | 21.1 | 18.6 |
| | Total particulate Pb (ppb) | 55.9 | 72.7 | 64.3 | 5.1 | 8.7 | 6.9 | 45.2 | 61.1 | 53.2 |
| | Particulate Pb removal % | 50.1 | 35.1 | 42.6 | 95.4 | 92.2 | 93.8 | 59.6 | 45.4 | 52.5 |
| | pH | 8.58 | 8.58 | 8.58 | 8.57 | 8.57 | 8.57 | 8.58 | 8.57 | 8.58 |
| | Flow rate ml/min | 288 | 297 | 292.5 | 253 | 258 | 255.5 | 258 | 262 | 260 |

The results from table 3 clearly demonstrated that the mixture of IER and NFC showed much higher particulate lead removal percentage than the blank IER or the comparison with the mixture of IER and cellulose fine powder supplied by Fiber Clear.

Example 4: Particulate Lead Removal Testing of Top Layer Wet-Laid by NFC

In this example, the raw material GAC were used as the same as the example 1. The raw material cellulose fine powder supplied by Fiber Clear (FC) was used the same as the example 3.

The columns preparation of the mixture media of GAC and NFC, and the mixture media of GAC and Fiber Clear were also followed by repeating the procedure of example 1.

The columns of top layer wet-laid by NFC or Fiber Clear (FC) were prepared by first preparing the 100 ml of NFC dispersion and 100 ml of Fiber Clear slurry by adding 0.2 g dry weight of NFC or 0.2 g dry weight of Fiber Clear into the 100 ml of deionized water, and followed by vigorously mixing for 30 minutes; then followed by respectively pouring the dispersion of NFC or slurry of FC into the plastic columns which were first placed a 40 micron filter paper at the bottom and then further filled with 50 grams of GAC. Finally another 40 microns filter paper was respectively placed on the top of wet laid NFC or FC in the columns.

The particulate lead testing water was prepared as the same procedures described in the example 1.

All the sampling and the particulate lead removal column testing were followed the same procedure described in the example 1.

All the particulate lead testing water samples were prepared and used as fresh.

The following table 4 listed the particulate lead removal results from the GAC and top wet-laid columns by NFC and FC.

The results clearly demonstrated that the top layer wet-laid by NFC showed significantly lower total lead in the effluent, and significantly higher particulate lead removal % than the control GAC alone or the top layer wet-laid by fine cellulose fiber supplied by Fiber Clear.

Example 5: Flow Rate Testing of Mixture Media in Brita Pitcher Chamber

Raw Material,

In this example, nanofibrillated cellulose (NFC), and granular active carbon (GAC), deionized water and VWR filter paper 417 used in the example are the same as described by the example 1.

The Brita Slim Model (40 oz capacity) and Brita Pitcher Filter Model OB03 were both purchased from Fred Meyer.

Testing Filter Sample Preparation

The mixture of GAC and nanofibrillated cellulose was prepared to follow up the procedure described in the above-said example 1. Into 300 mL of deionized water, predetermined amount of nanofibrillated cellulose was added and further dispersed by high speed mixing for 30 minutes, followed by adding 37 grams of GAC, and continued the mixing for another 10 minutes. The final mixture of GAC and nanofibrillated cellulose was separated by filtration and ready for use.

The Brita Pitcher Filter (Model # OB03) was cut on the top to provide an opening, followed by emptying the media of the filter housing. Into the empty housing of the filter, first 8 grams of GAC media was filled into the bottom, followed by filling the mixture of 37 grams of GAC and nanofibrillated cellulose prepared as above.

Another blank filter was prepared by filling 45 grams of GAC into the empty Brita Pitcher Filter (Model # OB03) housing.

Flow Rate Measurement

Brita Pitcher Slim model was used for the flow rate measurement. The-above prepared Brita filter was placed into the Brita Pitcher, and 1 L of deionized water was filled

TABLE 4

The particulate lead removal testing of GAC and top wet-laid columns

| | | GAC | | | Top layer wet-laid by NFC GAC | | | Top layer wet-laid by FC GAC | | |
|---|---|---|---|---|---|---|---|---|---|---|
| | | $1^{st}$ L | $2^{nd}$ L | Average | $1^{st}$ L | $2^{nd}$ L | Average | $1^{st}$ L | $2^{nd}$ L | Average |
| Influent | Total Pb (ppb) | 234 | 225 | 229.5 | 234 | 225 | 229.5 | 234 | 225 | 229.5 |
| | 0.1 μm Filtered (ppb) | 171 | 118 | — | 171 | 118 | — | 171 | 118 | — |
| | Total particulate Pb (ppb) | 63 | 107 | 85 | 63 | 107 | 85 | 63 | 107 | 85 |
| | pH | 8.52 | 8.53 | 8.53 | 8.52 | 8.53 | 8.53 | 8.52 | 8.53 | 8.53 |
| Effluent | Total Pb (ppb) | 93.3 | 87.4 | 90.4 | 81.6 | 75 | 78.3 | 94.3 | 89.2 | 91.8 |
| | 0.1 μm Filtered (ppb) | 48.8 | 43.2 | — | 55.8 | 49.6 | — | 50.1 | 46.5 | — |
| | Total particulate pb (ppb) | 44.5 | 44.2 | 44.4 | 25.8 | 25.4 | 25.6 | 44.2 | 42.7 | 43.5 |
| | Total particulate Pb removal (%) | 29.4 | 58.7 | 44.0 | 59.0 | 76.3 | 67.7 | 29.8 | 60.1 | 45.0 |
| | pH | 8.25 | 8.13 | 8.19 | 8.18 | 8.15 | 8.17 | 8.15 | 8.19 | 8.17 |
| | Flow Rate (mL/min) | 305 | 301 | 303 | 283 | 336 | 309.5 | 395 | 392 | 393.5 | in the upper reservoir of pitcher. The time needed for the 1 L of water completely pass through the pitcher filter was measured by 7 replicates.

TABLE 5 list the flow rate measurement results.

| Total GAC (g) | 45 | 45 | 45 | 45 | 45 | 45 | 45 |
|---|---|---|---|---|---|---|---|
| Amount of NFC (g, dry weight) | 0 | 0.18 | 0.54 | 0.63 | 0.72 | 0.81 | 0.90 |
| % NFC in the mixture of GAC and NFC | 0 | 0.48 | 1.43 | 1.67 | 1.91 | 2.14 | 2.37 |
| Average flow rate (ml/min) | 941 | 596 | 340 | 257 | 157 | 134 | 110 |

The results from the table 5 clearly demonstrated the flow rate of the gravity-fed pitcher filter cartridge is significantly determined by the amount of nanofibrillated cellulose in the mixture media of granular active carbon and NFC. As the amount of NFC increases, the flow rate will significantly decrease. The nanofibrillated cellulose could be used as an effective component to adjust the flow rate in a gravity-fed filter filled with a granular active carbon.

Example 6: SF53 pH 8.5 Lead Reduction Testing of Modified Brita Pitcher Filter

1. Material and Reagents

Nanofibrillated cellulose (NFC) wet cake supplied by Engineered Fiber Technologies, LLC.

GAC: Resin Tech AGC-50-CSAD, granule activated carbon supplied by Resin Tech Inc.

Brita Pitcher Filter OB03: purchase from Fred Myer,

Brita Pitcher: purchased from Fred Myer.

Ion Exchange Resin (IER): Resin Tech WACG-HP, a weak acid ion exchange resin, supplied by Resin Tech Inc., further pre-treated by soaking it into the pH3.7 buffer, and followed by 3 cycles of rinsing in the deionized water, and ready for the testing.

Lead (II) nitrate: Sigma-Aldrich, ACS reagent; Sodium Bicarbonate: VWR, ACS reagent; Magnesium Sulfate Heptahydrate: Sigma-Alich, ACS reagent; Calcium Chloridedihydrate:EMDChemicals 99.0%, 1.0 N Sodium Hydroxide solution, lab made; Deionized water (DI): resistivity>1.0 MΩ-cm (conductivity<1 μS/cm); VWR Filter paper 417 (pore size 40 μm), supplied by VWR.

2. Preparation of the Mixture Media of GAC and Nanofibrillated Cellulose (NFC)

Into 100 ml of the deionized water, 0.14 g of dry weight of NFC was added, and further dispersed by high-speed mixing to provide a slurry. Into the slurry, 40 ml of GAC was added and further mixing for 15 minutes, then the mixed media was separated by filtration. The whole media was ready for filling into the filter housing.

3. Preparation of the Modified Brita Pitcher Filters

The Brita Pitcher Filter OB03 was cut to open the top of the filter, and further empty it by removing all the media to obtain an empty Brita Pitcher Filter housing. Into the empty housing, 90 ml of pre-treated Resin Tech WACG-HP was placed first, followed by adding 40 ml of mixed media of GAC and NFC. Then the filter opening was glued and ready for the NSF 53 pH 8.5 lead reduction testing. Another control filter was prepared by only replacing the 40 ml of mixed media of GAC and NFC by 40 ml of GAC.

4. NSF 53 pH8.5 Lead Reduction Testing of Modified Brita Pitcher Filters

The detailed procedure of preparing NSF53 pH8.5 lead test water was described in the example 1.

After the modified Brita Pitcher Filters were inserted tightly into the Brita Pitchers, 1 L of the test water was poured into each Brita Pitcher container. The effluent was collected in the Brita Pitcher. The first 1 L of water sample was collected after two liters of test water was passed through the pitcher, then 1 L of effluent sample was collected in every 30 liters of testing volume during the total testing capacity of 300 L, and the sampling was respectively conducted at the pitcher testing volume at 30 L, 60 L, 90 L, 120 L, 150 L, 180 L, 210 L, 240 L, 270 L or 300 L. The pH of influent and effluent, and the flow rate of test water through the pitchers were measured. The lead concentration of the collected influent and effluent water samples were determined by EPA 200.8 protocol.

5. NSF 53 pH8.5 Lead Reduction Testing Results of Modified Brita Pitcher Filters The following table 6 demonstrated the NSF 53 pH8.5 lead reduction testing results of modified Brita Pitcher Filters. The filter filled with the mixed media of GAC and NFC showed the average of 1.9 ppb total lead in the effluent vs the average of 27.7 ppb total lead in the effluent of the control sample, the former 1.9 ppb of total lead is far below NSF 53 standard which sets up maximum 10.0 ppb. The original control filter failed in the NSF 53 standard testing, however, the modified Brita Pitcher Filter filled with the mixed media of GAC and NFC successfully passed the NSF53 testing standard for pH8.5 lead reduction.

TABLE 6

NSF53 pH 8.5 lead reduction testing results of modified Brita Pitcher Filters

| Filter | liter | 2 | 30 | 60 | 90 | 120 | 150 | 180 | 210 | 240 | 270 | 300 | Ave |
|---|---|---|---|---|---|---|---|---|---|---|---|---|---|
| NFC-GAC + IER | Flow rate ml/min | 143 | 137 | 120 | 120 | 113 | 110 | 113 | 115 | 120 | 119 | 121 | 121 |
| | pH | 5.96 | 5.78 | 5.98 | 6.21 | 6.46 | 6.45 | 6.56 | 6.9 | 6.75 | 6.96 | 6.92 | 6.45 |
| | Pb (ppb) | 0 | 0.9 | 0 | 1.1 | 1.7 | 2.0 | 2.4 | 3.1 | 3.8 | 2.8 | 3.4 | 1.9 |
| Control GAC + IER | Flow rate ml/min | 265 | 284 | 292 | 305 | 311 | 310 | 306 | 303 | 296 | 297 | 279 | 295 |
| | pH | 6.24 | 5.89 | 6.13 | 6.31 | 6.51 | 6.55 | 6.93 | 6.82 | 6.80 | 6.87 | 7.04 | 6.55 |
| | Pb (ppb) | 18.8 | 27.7 | 22.9 | 25.6 | 25.2 | 30.4 | 30.6 | 30.7 | 38.1 | 26.9 | 28.2 | 27.7 |
| Test water lead (ppb) | pH | 8.52 | 8.59 | 8.58 | 8.48 | 8.55 | 8.54 | 8.57 | 8.58 | 8.54 | 8.58 | 8.56 | 8.55 |
| | Total Pb (ppb) | 145 | 166 | 150 | 154 | 159 | 157 | 165 | 170 | 181 | 156 | 160 | 160 |
| | $[Pb_{tp}]$ (ppb) | 27 | 52 | 33 | 41 | 42 | 40 | 49 | 40 | 66 | 39 | 39 | 42.5 |
| | $[Pb_f]$ (ppb) | na | 18 | na | Na | na | na | 25 | na | Na | na | 16 | 19.7 |
| Test water % $[Pb_{tp}]$ % $[Pb_f]$ | % $[Pb_{tp}]$ | 18.6 | 31.3 | 22.0 | 26.6 | 26.4 | 25.5 | 29.7 | 23.5 | 36.5 | 25.0 | 24.4 | 26.3 |
| | % $[Pb_f]$ | na | 34.6 | na | Na | na | na | 51.0 | na | Na | na | 41.0 | 42.2 |

Example 7: NSF53 pH 6.5 Lead Reduction Testing of Modified Brita Pitcher Filter All the raw material and reagents used in this example are the same as described in example 6. The procedure of preparation of the mixture media of GAC and nanofibrillated cellulose (NFC), and the procedure of preparation of the modified Brita Pitcher Filters are repeated as described in example 6.

The procedure of preparation of test water is conducted according to NSF/ANSI 53 protocol (2011a published April 2012), the local tap water was used for the testing.

The lead stock solution was prepared by dissolving 0.0720 g of lead nitrate in 500 ml of deionized water with 10 drops of concentrated nitric acid added.

After the modified Brita Pitcher Filters were installed tightly into the Brita Pitchers, 30 L of test water was prepared in 55 L of plastic container, which was fed into the Brita Pitcher automatically using auto continuous feeder. 1 L of the influent and effluent water samples were collected when the total volume of effluent was reached to the following sampling points: 2 L, 75 L, 150 L, 225 L, 270 L and 300 L. The pH and residual lead from the collected effluent water samples were analyzed. The flow rate was also measured during the test water flowing through the filters. The lead concentration of the collected influent and effluent water samples were determined by EPA 200.8 method.

The following table 7 demonstrates the NSF 53 pH6.5 lead reduction testing results of modified Brita Pitcher Filter. The filter filled with the mixed media of GAC and NFC shows the average of 3.5 ppb total lead in the effluent vs the average 143.8 ppb found in the influent. The average of 3.5 ppb of lead found in the effluent is far below NSF 53 standard which sets up maximum 10.0 ppb. Therefore, the modified Brita pitcher filter can also efficiently reduce the lead in compliance with the lead reduction claim.

TABLE 7

NSF 53 pH 6.5 lead reduction testing of modified Brita pitcher filter

| Pb (150 ppb) | | 2 L | 75 L | 150 L | 225 L | 270 L | 300 L | Ave. |
|---|---|---|---|---|---|---|---|---|
| Influent | pH | 6.38 | 6.58 | 6.47 | 6.48 | 6.46 | 6.46 | 6.47 |
| Effluent | Flow (ml/min) | 102.6 | 82.0 | 87.6 | 94.2 | 79.7 | 83.8 | 88.3 |
| | pH | 6.29 | 6.08 | 6.62 | 6.07 | 5.83 | 5.96 | 6.14 |
| Lead (ppb) | influent | 143 | 146 | 154 | 148 | 145 | 127 | 143.8 |
| | effluent | 2.4 | 3.3 | 2.6 | 3.5 | 4.0 | 5.0 | 3.5 |

The invention claimed is:

1. Granular filtration media, comprising:
   nanofibers;
   granular activated carbon; and
   granular ion exchange resin,
   wherein the nanofibers are comprised in a mixture with more than one different granular particles, wherein the granular particles include at least granular activated carbon and granular ion exchange resin, and wherein the nanofibers include at least a polymeric nanofiber, and wherein the nanofibers comprise less than 2% dry weight of the granular filtration media.

2. The granular filtration media of claim 1, wherein the granular particles have an average particle size from 100 microns to 2,000 microns and the nanofibers have an average diameter from 5 nanometers to 2 microns.

3. The granular filtration media of claim 1, wherein the nanofibers comprise less than 1% by dry weight of the granular filtration media.

4. The granular filtration media of claim 1, wherein the granular filtration media has a moisture content of 3% to 70% by weight.

5. The granular filtration media of claim 1, wherein the mixture further comprises granular particles selected from granular activated alumina, granular diatomaceous earth, granular silica gel, granular zeolites, granular silicates, granular synthetic molecular sieves, granular mineral clay, granular aluminosilicates, granular titanates, granular bone char, granular KDF process media, granular iodated resins, granular ceramic, granular perlite, granular sand, granular hybrid of ion exchange resin with metal oxides, granular hybrid of activated carbon with metal oxides, functionalized granular activated carbon, polymeric adsorbent resins, or any combination thereof.

6. The granular filtration media of claim 1, wherein the polymeric nanofibers are nanofibrillated cellulose.

7. A method of making the granular filtration media of claim 1, comprising:
   dispersing the nanofibers in a solvent;
   adding the more than one different granular particles to the solvent;
   mixing the solvent with the nanofibers and the granular particles; and
   separating the solvent to make the granular filtration media.

8. The method of claim 7, further comprising drying the granular filtration media.

9. The method of claim 7, wherein the granular particles have an average particle size from 100 microns to 2,000 microns, and the nanofibers have an average diameter from 5 nanometers to 2 microns.

10. A method of removing impurities from a fluid, comprising:
    passing a fluid comprising an impurity through a filter comprising the granular filtration claim 1.

11. The method of claim 10, wherein the impurity is a halogen, heavy metal ion, organic compound, or a colloidal particle.

12. The method of claim 10, wherein the fluid is air or water.

13. The method of claim 10, wherein the granular particles have an average particle size from 100 microns to 2,000 microns and the nanofibers have an average diameter from 5 nanometers to 2 microns.

14. The method of claim 10, wherein the impurity is lead.

15. A filter, comprising: a filter chamber comprising the granular filtration media of claim 1.

16. A method of making a filtration system, comprising:
    installing a filter according to claim 15 in a gravity fed or low pressure filtration system, wherein the filtration system is capable of removing a metal selected from the group consisting of copper, zinc, mercury, cadmium, and lead; and further wherein the filtration system is capable of producing water in compliance with NSF 42 and NSF 53 standards.

17. A method of removing impurities from a fluid, comprising:
    passing a fluid comprising an impurity through a filter comprising the granular filtration media of claim 1, wherein the impurity is lead, copper, iron oxide, iron oxide hydroxide, silica, copper, mercury, cadmium, zinc, or any combination thereof.

* * * * *